(12) United States Patent
Kommareddy et al.

(10) Patent No.: US 12,019,904 B2
(45) Date of Patent: Jun. 25, 2024

(54) ALLEVIATING INTERCONNECT TRAFFIC IN A DISAGGREGATED MEMORY SYSTEM

(71) Applicant: Advanced Micro Devices, Inc., Santa Clara, CA (US)

(72) Inventors: Vamsee Reddy Kommareddy, Orlando, FL (US); Seyedmohammad SeyedzadehDelcheh, Sammamish, WA (US); Sergey Blagodurov, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/552,015

(22) Filed: Dec. 15, 2021

(65) Prior Publication Data

US 2023/0185478 A1  Jun. 15, 2023

(51) Int. Cl.
*G06F 3/00* (2006.01)
*G06F 3/06* (2006.01)
*G06F 9/50* (2006.01)
*G06F 12/0802* (2016.01)

(52) U.S. Cl.
CPC .......... *G06F 3/0655* (2013.01); *G06F 3/0602* (2013.01); *G06F 3/065* (2013.01); *G06F 3/0653* (2013.01); *G06F 9/5027* (2013.01); *G06F 12/0802* (2013.01); *G06F 2212/60* (2013.01)

(58) Field of Classification Search
None
See application file for complete search history.

(56) References Cited

U.S. PATENT DOCUMENTS

| | | | | |
|---|---|---|---|---|
| 11,061,735 | B2 * | 7/2021 | Li | H04L 67/1095 |
| 2017/0322893 | A1 * | 11/2017 | Tourrilhes | G06F 13/24 |
| 2021/0216227 | A1 * | 7/2021 | Kazi | G06F 11/3055 |
| 2022/0317883 | A1 * | 10/2022 | Ramanan | G06F 3/067 |
| 2022/0413922 | A1 * | 12/2022 | Hamlin | G06F 9/542 |

OTHER PUBLICATIONS

"Compute Express Link", CXL Consortium [retrieved Oct. 14, 2021]. Retrieved from the Internet <https://www.computeexpresslink.org/>., Mar. 11, 2019, 2 Pages.
"Educational Materials", Gen-Z Consortium [retrieved Oct. 14, 2021]. Retrieved from the Internet <https://genzconsortium.org/educational-materials/>., 2016, 6 Pages.

(Continued)

*Primary Examiner* — Midys Rojas
(74) *Attorney, Agent, or Firm* — FIG. 1 Patents

(57) ABSTRACT

One or both of read and write accesses to a fabric-attached memory module via a fabric interconnect are monitored. In one or more implementations, offloading of one or more tasks accessing the fabric-attached memory module to a processor of a routing system associated with the fabric-attached memory module is initiated based on the read and write accesses to the fabric-attached memory module. Additionally or alternatively, replicating memory of the fabric-attached memory module to a cache memory of a computing node in the disaggregated memory system executing one or more tasks of a host application is initiated based on the write accesses to the fabric-attached memory module.

20 Claims, 6 Drawing Sheets

(56) References Cited

OTHER PUBLICATIONS

"HPE Unveils Computer Built for the Era of Big Data", Hewlett Packard Enterprise Development LP [retrieved Oct. 14, 2021]. Retrieved from the Internet <https://www.hpe.com/us/en/newsroom/press-release/2017/05/a-new-computer-built-for-the-big-data-era.html>., May 16, 2017, 9 Pages.

Cheptsov, Alexey et al., "HPC in Big Data Age: An Evaluation Report for Java-Based Data-Intensive Applications Implemented with Hadoop and OpenMPI", EuroMPI/ASIA '14: Proceedings of the 21st European MPI Users' Group Meeting [retrieved Nov. 12, 2021]. Retrieved from the Internet <https://doi.org/10.1145/2642769.2642802>., Sep. 9, 2014, 6 pages.

Keeton, Kimberly et al., "Persistent memory: new tier or storage replacement?", Hewlett Packard Enterprise [retrieved Oct. 14, 2021]. Retrieved from the Internet <https://www.snia.org/sites/default/files/SDC/2017/presentations/General_Session/Keeton_Kimberly_Spence_Susan_Persistent_Memory_New_Tier_or_Storage_Replacement.pdf>., Sep. 2017, 43 Pages.

Kommareddy, Vamsee R. et al., "Enforcing Fairness in Disaggregated Non-Volatile Memory Systems", National Technology & Engineering Solutions of Sandia [retrieved 2021-10-12]. Retrieved from the Internet <https://cfwebprod.sandia.gov/cfdocs/CompResearch/docs/index1.pdf>., 2019, 14 Pages.

Kommareddy, Vamsee R. et al., "Exploring Allocation Policies in Disaggregated Non-Volatile Memories", MCHPC'18: Proceedings of the Workshop on Memory Centric High Performance Computing [retrieved Oct. 14, 2021]. Retrieved from the Internet <https://www.osti.gov/servlets/purl/1593020>., Nov. 11, 2018, 9 Pages.

Kommareddy, Vamsee R. et al., "Page Migration Support for Disaggregated Non-Volatile Memories", MEMSYS '19: Proceedings of the International Symposium on Memory Systems [retrieved Oct. 12, 2021]. Retrieved from the Internet <https://doi.org/10.1145/3357526.3357543>., Sep. 30, 2019, 11 Pages.

Lim, Kevin et al., "Disaggregated Memory for Expansion and Sharing in Blade Servers", ACM SIGARCH Computer Architecture News, vol. 37, No. 3 [retrieved Oct. 13, 2021]. Retrieved from the Internet <https://web.eecs.umich.edu/~twenisch/papers/isca09-disaggregate.pdf>., Jun. 20, 2009, 12 Pages.

* cited by examiner

ALLEVIATING INTERCONNECT TRAFFIC IN A DISAGGREGATED MEMORY SYSTEM

BACKGROUND

As computer technology has advanced, applications have become increasingly complex. This increasing complexity results in applications using increasing amounts of system resources such as memory. Disaggregated memory systems are being developed that include multiple computing nodes coupled to multiple memory modules via a fabric interconnect allowing the computing nodes to communicate with large amounts of memory at a high speed.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
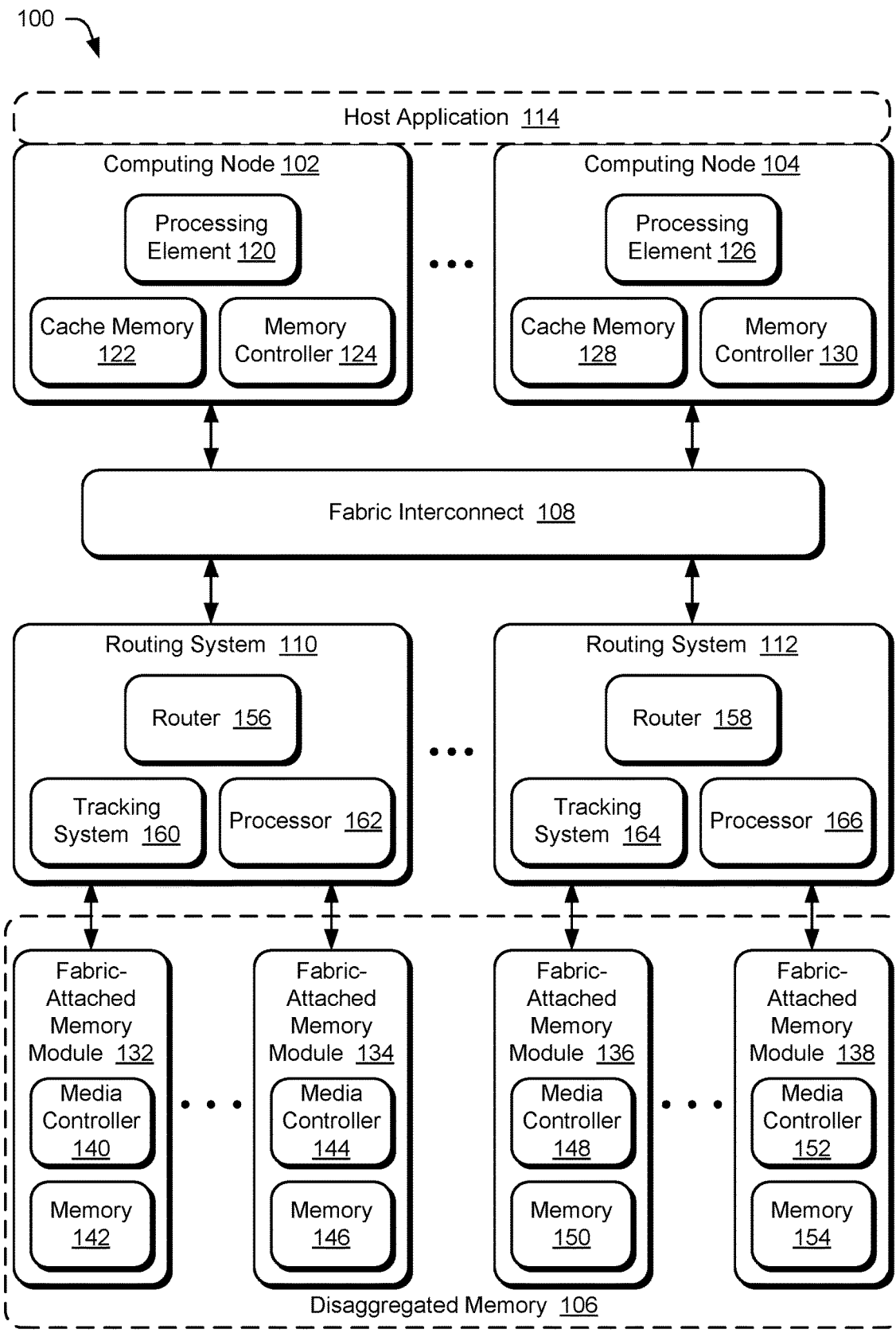
FIG. 1 is an illustration of a disaggregated memory system in an example implementation that is operable to employ the alleviating interconnect traffic in a disaggregated memory system described herein.

Disaggregated memory systems include one or more computing nodes coupled via a fabric interconnect to multiple fabric-attached memory modules. Each computing node (e.g., a system on chip (SoC)) includes a processing element (e.g., processor or processor core) and a memory controller. Each fabric-attached memory module includes any of various types of memory (e.g., volatile memory such as dynamic random access memory (DRAM), nonvolatile memory such as Flash memory). Memory access requests from a process or thread executed by the processing element of a computing node are communicated through the fabric interconnect to a media controller of a fabric-attached memory module that includes the requested memory. A disaggregated memory system alleviates the need for each computing node to have its own memory by allowing multiple computing nodes to share the memory (e.g., hundreds of terabytes) in the multiple fabric-attached memory modules.

One problem experienced with disaggregated memory systems is that a large amount of memory requests (e.g., read and write accesses) are passed across the fabric interconnect. This results in various situations arising that delay memory accesses by a computing node, such as situations in which a large number of memory accesses from one computing node targeting one fabric-attached memory module dominate the fabric interconnect and starve off accesses from another computing node accessing another fabric-attached memory module.

The techniques discussed herein alleviate traffic on the fabric interconnect by identifying when a large number of memory accesses from one computing node are targeting a particular fabric-attached memory module and offloading the task or tasks making those accesses to a processor associated with the particular fabric-attached memory module (e.g., a processor coupled to or included as part of a router that routes requests to the particular fabric-attached memory module). The processor associated with the particular fabric-attached memory module is local to the fabric-attached memory module and executes the task communicating with the fabric-attached memory module directly rather than via the fabric interconnect, thus alleviating the traffic on the fabric interconnect resulting from execution of the task.

Another situation that arises in disaggregated memory systems is a computing node issuing only a small number of write accesses targeting a fabric-attached memory module, which consume bandwidth on the fabric interconnect that could be used by other computing nodes. The techniques discussed herein alleviate traffic on the fabric interconnect resulting from a computing node issuing only a small number of write accesses by identifying when a small number of write accesses from one computing node are targeting a particular fabric-attached memory module and replicating the data in the fabric-attached memory module in a local cache memory of the computing node. Traffic on the fabric interconnect is reduced because the computing node has a local copy of the data in the fabric-attached memory module and thus need not access the fabric-attached memory module via the fabric interconnect in order to read the data from or write the data to the local copy. Furthermore, because of the small number of write accesses there is little traffic introduced on the fabric interconnect to maintain consistency between the local copy of the data at the computing node and the data stored in the fabric-attached memory module.

In some examples, the techniques described herein relate to a method including: monitoring read and write accesses to a fabric-attached memory module received via a fabric interconnect of a disaggregated memory system; and initiating, based on the read and write accesses to the fabric-attached memory module, offloading of one or more tasks accessing the fabric-attached memory module to a processor of a routing system associated with the fabric-attached memory module.

In some examples, the techniques described herein relate to a method, further including detecting when the read and write accesses to the fabric-attached memory module satisfy a rule, and the initiating including initiating offloading of the one or more tasks in response to detecting that the read and write accesses to the fabric-attached memory module satisfy the rule.

In some examples, the techniques described herein relate to a method, the rule including a total read and write traffic to the fabric-attached memory module over a duration of time exceeding a threshold amount, the threshold amount being a percentage of a total read and write traffic to the fabric-attached memory module as well as one or more additional fabric-attached memory modules coupled to the routing system.

In some examples, the techniques described herein relate to a method, further including: detecting, after the one or more tasks are offloaded to the processor, that the rule is no longer satisfied; and indicating, in response to detecting that the rule is no longer satisfied, to cease offloading of the one or more tasks to the processor.

In some examples, the techniques described herein relate to a method, the one or more tasks including one or more threads of a host application running in the disaggregated memory system.

In some examples, the techniques described herein relate to a method, the one or more tasks including all tasks of a host application running in the disaggregated memory system that read from or write to the fabric-attached memory module.

In some examples, the techniques described herein relate to a method, further including initiating, based on the write access to the fabric-attached memory module, replicating memory of the fabric-attached memory module to a cache memory of a computing node in the disaggregated memory system executing one or more tasks of a host application.

In some examples, the techniques described herein relate to a method, further including detecting when the write accesses to the fabric-attached memory module satisfy a rule, and the initiating replicating of the memory including initiating replicating of the memory in response to detecting that the write accesses to the fabric-attached memory module satisfy the rule.

In some examples, the techniques described herein relate to a method, the rule including a total write traffic to the fabric-attached memory module over a duration of time falling below a threshold amount, the threshold amount being a percentage of a total write traffic to the fabric-attached memory module as well as one or more additional fabric-attached memory modules coupled to the routing system.

In some examples, the techniques described herein relate to a method including: receiving an indication that read and write accesses to a fabric-attached memory module via a fabric interconnect of a disaggregated memory system satisfy a rule; and transferring, in response to the indication, a task accessing the fabric-attached memory module from execution by a computing node that accesses, via the fabric interconnect, a router coupled to the fabric-attached memory module to execution by a processor that is associated with and directly accesses the router.

In some examples, the techniques described herein relate to a method, the task including a thread of a host application running in the disaggregated memory system.

In some examples, the techniques described herein relate to a method, the task including all threads of a host application running in the disaggregated memory system that read from or write to the fabric-attached memory module.

In some examples, the techniques described herein relate to a method, the rule including a total read and write traffic to the fabric-attached memory module over a duration of time exceeding a threshold amount.

In some examples, the techniques described herein relate to a system including: a router to receive write accesses to a fabric-attached memory module via a fabric interconnect of a disaggregated memory system; and a memory replication triggering module to receive access data describing the write accesses to the fabric-attached memory module and initiate, based on the write accesses to the fabric-attached memory module, replicating memory of the fabric-attached memory module to a cache memory of a computing node in the disaggregated memory system executing one or more tasks of a host application.

In some examples, the techniques described herein relate to a system, the memory replication triggering module being further to detect when the write accesses to the fabric-attached memory module satisfy a rule, and wherein to initiate replicating the memory is to initiate replicating the memory in response to detecting that the write accesses to the fabric-attached memory module satisfy the rule.

In some examples, the techniques described herein relate to a system, the rule including a total write traffic to the fabric-attached memory module over a duration of time falling below a threshold amount, the threshold amount being a percentage of a total write traffic to the fabric-attached memory module as well as one or more additional fabric-attached memory modules coupled to the router.

In some examples, the techniques described herein relate to a system, the memory replication triggering module being further to detect, after initiating replicating the memory, that the rule is no longer satisfied, and to indicate, in response to detecting that the rule is no longer satisfied, to cease replicating the memory to the cache memory of the computing node.

In some examples, the techniques described herein relate to a system, further including a processor and a task offload triggering module to receive the access data describing the write accesses as well as access data describing read accesses to the fabric-attached memory module, and to initiate, based on the read and write accesses to the fabric-attached memory module, offloading of one or more tasks accessing the fabric-attached memory module to the processor.

In some examples, the techniques described herein relate to a system, the task offload triggering module being further to detect when the read and write accesses to the fabric-attached memory module satisfy a rule, and to initiate offloading of the one or more tasks in response to detecting that the read and write accesses to the fabric-attached memory module satisfy the rule.

In some examples, the techniques described herein relate to a system, the rule including a total read and write traffic to the fabric-attached memory module over a duration of time exceeding a threshold amount, the threshold amount being a percentage of a total read and write traffic to the fabric-attached memory module as well as one or more additional fabric-attached memory modules coupled to the router.

FIG. 1 is an illustration of a non-limiting example disaggregated memory system 100 that is operable to employ the alleviating interconnect traffic in a disaggregated memory system described herein. The disaggregated memory system 100 includes multiple computing nodes 102 and 104, disaggregated memory 106, a fabric interconnect 108, and multiple routing systems 110 and 112. It should be noted that the disaggregated memory system 100 includes any number of computing nodes analogous to computing node 102 or 104, and includes any number of routing systems analogous to routing system 110 or 112. An application, referred to as the host application 114, is executed across the computing nodes 102 and 104. Although a single host application 114 is illustrated, any number of applications are executed across the computing nodes 102 and 104 concurrently.

Generally, a disaggregated memory system refers to a system in which various memory nodes or modules (illustrated as fabric-attached memory modules as discussed in more detail below) are shared across multiple computing nodes. Although in one or more implementations each computing node has a local cache memory, larger amounts of memory need not be co-located with the computing node. Rather, larger amounts of memory (e.g., hundreds of terabytes or more) are located in the memory modules. Given the high speed of the fabric interconnect, memory accesses between computing nodes and fabric-attached memory modules are very fast. Accordingly, in a disaggregated memory system, accesses to memory addresses (or memory cache lines) that are not included in the local cache memory are satisfied by accessing those memory addresses or cache lines in one of the fabric-attached memory modules via the fabric interconnect.

The disaggregated memory system 100 is implemented using any of a variety of topologies, such as a dragonfly topology, a bus topology, a tree topology, a mesh topology, and so forth.

Each computing node 102 and 104 is, for example, a system on a chip (SoC), a server device such as a blade server, a laptop or mobile device, or any of various other types of computing systems or devices. The computing node 102 includes a processing element 120, a cache memory 122, and a memory controller 124. The computing node 104 includes a processing element 126, a cache memory 128, and a memory controller 130. The computing nodes 102 and 104 include any of a variety of additional components, such as one or more buses, one or more input/output (I/O) interfaces, and so forth.

Each processing element 120 and 126 is a processor, such as one or more central processing units (CPUs) having one or more cores, a core of a CPU, a parallel accelerated processor, and so forth. In one or more implementations, each processing element 120 and 126 executes various instructions, such as software or firmware instructions. Cache memory 122 is a local cache memory for the processing element 120 and cache memory 128 is a local cache memory for the processing element 126. Each cache memory 122 and 128 is, for example, volatile memory such as DRAM or static random access memory (SRAM), or nonvolatile memory such as NAND Flash memory, NOR Flash memory, Ferroelectric Random Access Memory (FeRAM), or 3D Xpoint memory. Memory controller 124 manages access to disaggregated memory 106 for the processing element 120, communicating memory requests (e.g., read and write requests) to the disaggregated memory 106 via the fabric interconnect 108 and receiving responses (e.g., data, confirmation, etc.) via the fabric interconnect 108. Similarly, memory controller 130 manages access to disaggregated memory 106 for the processing element 126, communicating memory requests (e.g., read and write requests) to the disaggregated memory 106 via the fabric interconnect 108 and receiving responses (e.g., data, confirmation, etc.) via the fabric interconnect 108.

The fabric interconnect 108 is a high-speed interconnect, such as one or more switches, that allow the computing nodes 102 and 104 to each communicate with any of the memory in the disaggregated memory 106. The fabric interconnect 108 is able to, for example, transfer data at rates of multiple terabits per second and higher.

The disaggregated memory 106 includes multiple fabric-attached memory modules 132, 134, 136, and 138. It should be noted that the disaggregated memory 106 includes any number of fabric-attached memory modules analogous to fabric-attached memory module 132, 134, 136, or 138. Fabric-attached memory module 132 includes a media controller 140 and memory 142. Similarly, fabric-attached memory module 134 includes a media controller 144 and memory 146, fabric-attached memory module 136 includes a media controller 148 and memory 150, and fabric-attached memory module 138 includes a media controller 152 and memory 154.

The memory 142, 146, 150, and 154 is any of various different types of memory, such as volatile memory (e.g., DRAM, SRAM) or nonvolatile memory (e.g., NAND Flash memory, NOR Flash memory, FeRAM, or 3D Xpoint memory). Different fabric-attached memories optionally include different types of memory. In one or more implementations, each fabric-attached memory module 132, 134, 136, and 138 is a device (e.g., a server blade) that is readily attached to the fabric interconnect 108 to increase the memory capacity of disaggregated memory 106 or detached from the fabric interconnect 108 to decrease the memory capacity of disaggregated memory 106.

The routing systems 110 and 112 route memory requests from fabric interconnect 108 to the appropriate ones of the fabric-attached memory modules 132-138 and return responses to the appropriate computing nodes 102 and 104 via the fabric interconnect 108. It should be noted that the disaggregated memory system 100 includes any number of routing systems analogous to routing systems 110 or 112. The routing system 110 includes a router 156 and the routing system 112 includes a router 158. Each routing system 110 and 112 (and thus the components of each routing system 110, including each router 156 and 158) is associated with one or more particular fabric-attached memory modules. Being associated with a particular fabric-attached memory module refers to the routing system receiving and responding to memory requests for memory locations (e.g., memory addresses) stored in the particular fabric-attached memory module. As illustrated, routing system 110 is associated with fabric-attached memory modules 132 and 134, and routing system 112 is associated with fabric-attached memory modules 136 and 138.

Memory requests from a memory controller 124 or memory controller 130 are received by the routing systems 110 and 112 and the router 156 or 158 corresponding to the memory location of the memory request routes the memory request to the media controller of the fabric-attached memory module that includes that memory location. For example, assume the memory controller 124 issues a memory request to read a memory location in memory 142. The memory request is communicated to the router 156 via the fabric interconnect 108, and the router 156 communicates the request to the media controller 140. The media controller 140 reads the requested memory location and returns the requested data to the memory controller 124 via the router 156 and the fabric interconnect 108.

By way of another example, assume the memory controller 130 issues a memory write request to write data to a memory location in memory 146. The memory request is communicated to the router 156 via the fabric interconnect 108, and the router 156 communicates the request to the media controller 144. The media controller 144 writes the data to the requested memory location and optionally returns confirmation of the write to the memory controller 130 via the router 156 and the fabric interconnect 108.

Memory consistency in the disaggregated memory system 100, such as between the cache memories 122 and 128 and the disaggregated memory 106, is maintained using any of a variety of public or proprietary memory management protocols. For example, in one or more implementations memory consistency in the disaggregated memory system 100 is maintained in accordance with the Compute Express Link™ (CXL™) cache-coherent interconnect or the Gen-Z Consortium.

The host application 114 is any of various different applications. In one or more implementations, the host application 114 is a graph traversal application. Each vertex of a graph is processed, for example, at one of the processing elements 120 and 126. Applications such as graph traversal applications oftentimes have irregular demands for both compute (the type and volume of analysis that happens in each vertex) and memory (how many neighboring vertices' data that is reachable through the graph edges has to be pulled to perform the analysis). The disaggregated memory system 100 is well-suited to running such applications due to each computing node 102 and 104 not needing to maintain a large amount of local memory—each computing node 102 and 104 need not include enough local memory to perform analysis needing a large amount of data because the computing nodes 102 and 104 have access to whatever memory they need in the disaggregated memory 106. Furthermore, the techniques discussed herein alleviate traffic on the fabric interconnect when a large amount of memory is being requested from a particular fabric-attached memory module.

The routing system 110 includes a tracking system 160 and a processor 162. The tracking system 160 and processor 162 are associated with or correspond to the same fabric-attached memory modules as the routing system 110, fabric-attached memory modules 132 and 134 as illustrated. Similarly, the routing system 112 includes a tracking system 164 and a processor 166. The tracking system 164 and processor 166 are associated with or correspond to the same fabric-attached memory modules as the routing system 112, fabric-attached memory modules 136 and 138 as illustrated.

The tracking systems 160 and 164 each track accesses to the associated fabric-attached memory modules 132-138. For example, tracking system 160 tracks accesses to fabric-attached memory module 132 and fabric-attached memory module 134, and tracking system 164 tracks read and write requests to fabric-attached memory module 136 and fabric-attached memory module 138. The tracking systems 160 and 164 track various different information related to accesses, such as the number of hosts (e.g., the number of computing nodes or processing elements) accessing each of the fabric-attached memory modules 132 and 134, a task (e.g., processes or threads of a host application) or processing element requesting each access to a fabric-attached memory module 132 or 134, the read traffic (e.g., in megabytes per second (MB/s)) from each host to a fabric-attached memory module, the write traffic (e.g., in MB/s) from each host to a fabric-attached memory module, and so forth.

In one or more implementations, each of the tracking systems 160 and 164 detects when a rule is satisfied, such as combined read and write traffic to a fabric-attached memory module over a particular duration of time (e.g., 100 seconds) exceeds a threshold amount (e.g., 90% of the read and write traffic). In response to the rule being satisfied, the tracking system 160 or 164 that detected the rule being satisfied initiates offloading one or more tasks (e.g., threads or processes of the host application 114) to the processor in the same routing system 110 or 112 as the tracking system 160 or 164 that detected the rule being satisfied. The one or more tasks that are offloaded are the tasks that are generating the read and write traffic to the fabric-attached memory module.

Additionally or alternatively, each of the tracking systems 160 and 164 detects when a different rule is satisfied, such as write traffic to a fabric-attached memory module over a particular duration of time (e.g., 100 seconds) falls below a threshold amount (e.g., 10% of the write traffic). In response to the rule being satisfied, the tracking system 160 or 164 that detected the rule being satisfied initiates replication of the memory in the fabric-attached memory module to each of the computing node 102 or 104 that are accessing the fabric-attached memory module.

In general, functionality, features, and concepts described in relation to the examples above and below are employable in the context of the example systems, methods, and procedures described herein. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combined in different ways. Thus, individual functionality, features, and concepts described in relation to different example environments, devices, components, figures, and procedures herein are usable in any suitable combinations and are not limited to the particular combinations represented by the enumerated examples in this description.

Figure 2:
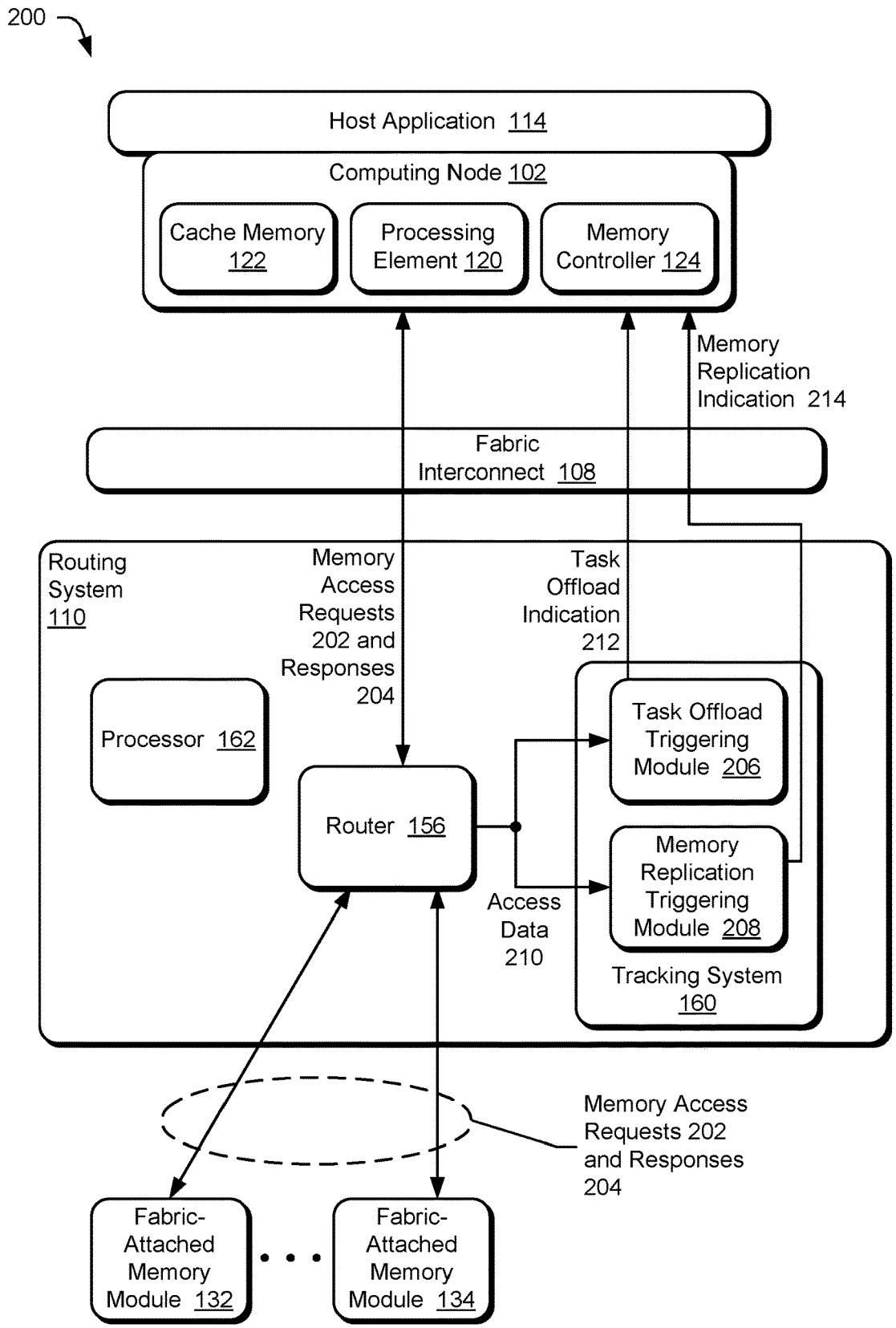
FIGS. 2, 3, and 4 are illustrations of examples of a routing system and routing system operation.

FIG. 2 is an illustration of an example 200 of a routing system and routing system operation. The example 200 includes host application 114, computing node 102, fabric interconnect 108, routing system 110, fabric-attached memory module 132, and fabric-attached memory module 134. A single routing system, a single computing node, and two fabric-attached memory modules are illustrated in the example 200 for ease of explanation. It should be noted that any number of computing nodes, any number of routing systems, and any number of fabric-attached memory modules are usable with the techniques discussed herein.

In the example 200, memory access requests 202 are issued from the computing node 102 and responses 204 are returned from the appropriate one of the fabric-attached memory module 132 and the fabric-attached memory module 134.

The tracking system 160 includes a task offload triggering module 206 and a memory replication triggering module 208. The tracking system 160 is implemented in any of a variety of different manners, such as on-chip logic included in the same integrated circuit as the router 156, as an application-specific integrated circuit (ASIC), as a field-programmable gate array (FPGA), as a complex programmable logic device (CPLD), and so forth. The task offload triggering module 206 and the memory replication triggering module 208

The task offload triggering module 206 receives access data 210, which is data describing the memory access requests 202 received by the router 156. The task offload triggering module 206 tracks and records any of various data regarding the memory access requests 202. In one or more implementations, the task offload triggering module 206 tracks and records, for each fabric-attached memory module 132 and 134, the number of hosts or tasks (e.g., processes or threads of a host application) accessing the fabric-attached memory module. Additionally or alternatively, the task offload triggering module 206 tracks and records the read traffic (e.g., in MB/s) from each host to each fabric-attached memory module 132 and 134. Additionally or alternatively, the task offload triggering module 206 tracks and records the write traffic (e.g., in MB/s) from each host to each fabric-attached memory module 132 and 134. Additionally or alternatively, the task offload triggering module 206 tracks and records a number of read or write accesses to each fabric-attached memory module 132 and 134. Additionally or alternatively, the task offload triggering module 206 tracks and records a frequency at which each fabric-attached memory module 132 and 134 is accessed (e.g., a read access or a write access). Additionally or alternatively, the task offload triggering module 206 tracks and records a number of processing elements that access each of the fabric-attached memory module 132 and 134.

The task offload triggering module 206 detects when a rule is satisfied and provides a task offload indication 212 to the host application 114 (e.g., via the fabric interconnect 108) in response to a rule being satisfied. The task offload triggering module 206 uses any of a variety of different rules to determine, based on the access data 210 tracked and recorded by the task offload triggering module 206, when to provide the task offload indication 212 to the host application 114, such as any rule indicating that read or write accesses to a fabric-attached memory module 132 or 134 are starving off or hindering accesses to one or more other fabric-attached memory modules (whether coupled to the router 156 or to another router in the disaggregated memory system) due to traffic over the fabric interconnect 108.

In one or more implementations, the task offload triggering module 206 uses a rule of the total read and write traffic to a fabric-attached memory module 132 or 134 over a duration of time (e.g., 100 seconds) exceeding a threshold amount (e.g., 90% of the total read and write traffic to the fabric-attached memory modules 132 and 134). The task offload triggering module 206 determines the amount of read and write traffic (e.g., in MBs) in each epoch (e.g., each second) over the duration of time and determines the amount of read and write traffic over the duration of time (e.g., averages the amount of read and write traffic in each epoch, sums the amount of read and write traffic in each epoch). The amount of read and write traffic over the duration of time is determined for the router 156 (e.g., for all read and write traffic received by the router 156 during the duration of time) as well as for each fabric-attached memory module 132 and 134 (e.g., the amount of read and write traffic to each fabric-attached memory module 132 and 134). The task offload triggering module 206 determines that the rule is satisfied if the amount of read and write traffic to a fabric-attached memory module 132 or 134 exceeds a threshold amount (e.g., 90% of the read and write traffic received by the router 156).

Additionally or alternatively, the task offload triggering module 206 uses a rule of the total read and write traffic to multiple (e.g., two) fabric-attached memory modules over a duration of (e.g., 100 seconds) time exceeding a threshold amount (e.g., 90% of the read and write traffic). For example, assume that five fabric-attached memory modules are coupled to the router 156. The task offload triggering module 206 determines the amount of read and write traffic (e.g., in MBs) in each epoch (e.g., each second) over the duration of time and determines the amount of read and write traffic over the duration of time (e.g., averages the amount of read and write traffic in each epoch, sums the amount of read and write traffic in each epoch). The amount of read and write traffic over the duration of time is determined for the router 156 (e.g., for all read and write traffic received by the router 156 during the duration of time) as well as for each of the five fabric-attached memory modules. The task offload triggering module 206 determines that the rule is satisfied if the amount of read and write traffic to any two fabric-attached memory modules exceeds a threshold amount (e.g., 90% of the read and write traffic received by the router 156).

In one or more implementations, the tracking system 160 also receives access data from other tracking systems in other routing systems (e.g., tracking system 164 in routing system 112). This additional access data from other tracking systems allows task offload triggering module 206 to use rules to determine when to provide the task offload indication 212 to the host application 114 that are based on the access data 210 tracked and recorded by the task offload triggering module 206 as well as the additional access data tracked and recorded by other tracking systems.

For example, the task offload triggering module 206 uses a rule of the total read and write traffic to a fabric-attached memory module 132 or 134 over a duration of time (e.g., 100 seconds) exceeding a threshold amount (e.g., 40% of the read and write traffic in the disaggregated memory system). The task offload triggering module 206 determines the amount of read and write traffic (e.g., in MBs) in each epoch (e.g., each second) over the duration of time and determines the amount of read and write traffic over the duration of time (e.g., averages the amount of read and write traffic in each epoch, sums the amount of read and write traffic in each epoch). The task offload triggering module 206 also receives additional access data indicating the amount of read and write traffic (e.g., in MBs) in each epoch over the duration of time received by one or more other routing systems. The amount of read and write traffic over the duration of time is determined for the disaggregated memory system (e.g., the router 156 and all other routers for which the additional access data was received) as well as for each fabric-attached memory module 132 and 134 (e.g., the amount of read and write traffic to each fabric-attached memory module 132 and 134). The task offload triggering module 206 determines that the rule is satisfied if the amount of read and write traffic to a fabric-attached memory module 132 or 134 exceeds a threshold amount (e.g., 40% of the read and write traffic for the disaggregated memory system).

In one or more implementations, the duration of time and the epoch are configurable parameters, for example settable by an administrator or user of the disaggregated memory system.

In one or more implementations, the duration and epoch of time are a rolling window. For example, every 1 second or every 5 seconds the task offload triggering module 206 determines whether a rule is satisfied by the preceding duration of time. Additionally or alternatively, the duration and epoch of time are fixed. For example, after a duration of time elapses the next duration of time begins, so if the duration of time is 100 seconds then a new duration of time begins every 100 seconds.

In response to a rule being satisfied, the task offload triggering module 206 communicates the task offload indication 212 to a computing node running the host application 114 (computing node 102 in the illustrated example) to initiate offloading one or more tasks (e.g., threads or processes of the host application 114) to the processor 162. The task offload triggering module 206 communicates the task offload indication 212 to any of the computing nodes running the host application 114, such as a computing node running one or more tasks that are generating the read and write traffic to the fabric-attached memory module 132 or 134 that caused the rule to be satisfied. The one or more tasks that are offloaded are the tasks that are generating the read and write traffic to the fabric-attached memory module 132 or 134 that caused the rule to be satisfied.

Offloading one or more tasks to the processor 162 includes communicating the code or instructions of each task (e.g., of a thread or process) to the processor 162 (e.g., via the fabric interconnect 108) for the processor 162 to execute. Execution of any copy of the task at the computing node 102 ceases. Any data or other communication the task has with other tasks executing on the computing node 102 is returned to those other tasks via the fabric interconnect 108.

Offloading one or more tasks to the processor 162 allows the read and write accesses for the one or more tasks to be communicated to the fabric-attached memory module 132 or the fabric-attached memory module 134 without accessing fabric interconnect 108, thereby reducing or alleviating traffic on the fabric interconnect 108. In one or more implementations, the processor 162 implements a memory controller (e.g., analogous to memory controller 124) to support the read and write accesses to the fabric-attached memory module 132 or 134. Additionally or alternatively, an additional memory controller (not shown) is coupled to the processor 162 to support the read and write accesses to the fabric-attached memory module 132 or 134.

Figure 3:
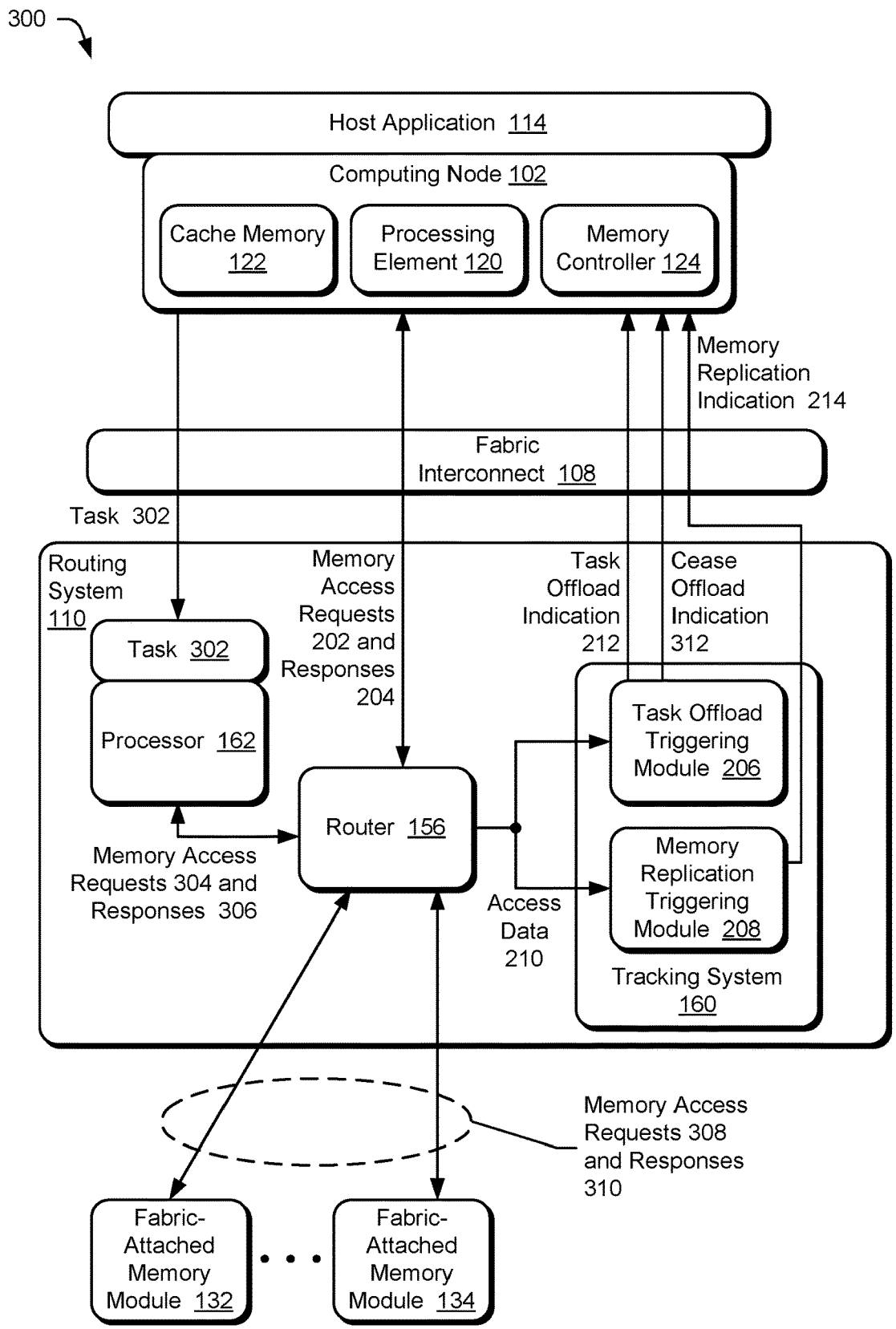

FIG. 3 is an illustration of an example 300 of a routing system and routing system operation. The example 300 is similar to the example 200 of FIG. 2 but includes a task 302 that has been offloaded from the computing node 102 to the processor 162. The processor 162 includes, or is coupled to, a memory controller that outputs requests in the same format or manner as the memory controller 124, allowing the router 156 to treat memory access requests from the processor 162 the same as from the computing node 102. The processor 162 executing the task 302 issues memory access requests 304 to the fabric-attached memory module 132 and the fabric-attached memory module 134 via the router 156, and responses 306 are received. The router 156 provides the memory access requests 304 as well as the memory access requests 202 to the fabric-attached memory modules 132 and 134 received from the computing node 102 as memory access requests 308. Responses 310 are received by the router 156 from the fabric-attached memory modules 132 and 134, and these responses 310 are provided to the appropriate one of the processor 162 as responses 306 and the computing node 102 as responses 204. Thus, the processor 162 directly accesses the router 156, providing memory access requests 304 to the router 156 and receiving responses 306 locally at the routing system 110 without accessing the fabric interconnect 108.

In response to the task offload indication 212, one or more tasks are offloaded from the computing node 102 to the processor 162. In one or more implementations, all tasks that are generating the read and write traffic to the fabric-attached memory module 132 or 134 that caused the rule to be satisfied are offloaded to the processor 162.

Additionally or alternatively, only a subset of the tasks that are generating the read and write traffic to the fabric-attached memory module 132 or 134 that caused the rule to be satisfied are offloaded to the processor 162. Which tasks to include in the subset that are offloaded to the processor 162 is determined in any of a variety of different manners. For example, one or two tasks that access the fabric-attached memory module 132 or 134 the most frequently (e.g., during the duration of time for the rule that was satisfied as discussed above) are included in the subset that are offloaded to the processor 162. By way of another example, the tasks that in combination account for at least a threshold amount (e.g., 90%) of read and write traffic to the fabric-attached memory module 132 or 134 from the computing node 102 (e.g., during the duration of time for the rule that was satisfied as discussed above) are included in the subset that are offloaded to the processor 162.

The tasks that are generating the read and write traffic to the fabric-attached memory module 132 or 134 that caused the rule to be satisfied are offloaded to the processor 162 are identified in various manners. In one or more implementations, the host application 114 is aware of (e.g., executes a thread on the computing node 102 to identify) which tasks are accessing which fabric-attached memory modules (e.g., based on the memory addresses accessed by those tasks). Additionally or alternatively, task offload triggering module 206 tracks and records the task that each memory access request 202 is received from and returns that information to the host application 114. In one or more implementations, the task offload triggering module 206 also provides any other information tracked by the task offload triggering module 206, or used by the task offload triggering module 206 to determine whether a rule is satisfied, to the host application 114 to facilitate the host application 114 determining which one or more tasks to offload to the processor 162.

The task offload triggering module 206 continues to receive access data 210 while the task 302 is being executed by the processor 162. This access data 210 includes data describing the memory access requests 202 as well as the memory access requests 304 issued by the processor 162. The task offload triggering module 206 detects when the rule that was satisfied and resulted in offloading of the task 302 to the processor 162 is no longer satisfied. In response to determining that the rule is no longer satisfied, the offload triggering module 206 communicates a cease offload indication 312 to the host application 114 (e.g., via the fabric interconnect 108) to no longer offload the one or more tasks to the processor 162. These one or more tasks are the one or more tasks that were offloaded to the processor 162 in response to the task offload indication 212.

In response to the cease offload indication 312, the host application 114 communicates an indication to the processor 162 to cease executing the one or more tasks (e.g., one or more threads or processes). The code or instructions of each of the tasks is returned to the processor 162 if not already maintained at the computing node 102. The processor 162 ceases executing the task and the processing element 120 begins or resumes executing the task.

In one or more implementations, if the rule that was satisfied and resulted in offloading of the task 302 to the processor 162 included a threshold value, the task offload triggering module 206 uses a different threshold for the rule when detecting whether the rule is no longer satisfied. This different threshold value is, for example, 5% or 10% higher or lower than the threshold value of the rule when determining whether to offload the task 302 to the processor 162. This avoids situations in which the task is repeatedly offloaded to the 162 then having that offloading cease because the rule is satisfied by values very close to the threshold value.

For example, if the rule is the total read and write traffic to a fabric-attached memory module 132 or 134 over a duration of time (e.g., 100 seconds) exceeding a threshold amount (e.g., 90% of the read and write traffic), after the rule is satisfied and the task 302 is offloaded to the processor 162, that threshold amount is lowered (e.g., to 80% or 85%). Accordingly, the task offload triggering module 206 does not detect that the rule is no longer satisfied until the total read and write traffic no longer exceeds the lowered threshold amount (e.g., 80% or 85%). Thus, if the total read and write traffic to a fabric-attached memory module 132 or 134 is hovering around 89%-91% of the read and write traffic, the task 302 is not repeatedly switching between being offloaded to the processor 162 and not being offloaded to the processor 162.

Returning to FIG. 2, the memory replication triggering module 208 detects when a rule is satisfied and provides a memory replication indication 214 to the host application 114 (e.g., via the fabric interconnect 108) in response to a rule being satisfied. The memory replication triggering module 208 receives, tracks, and records the access data 210, analogous to the task offload triggering module 206. The memory replication triggering module 208 uses any of a variety of different rules to determine, based on the access data 210, when to provide the memory replication indication 214 to the host application 114, such as any rule indicating that the overhead of maintaining a replica of a fabric-attached memory module in the cache memory 122 (e.g., amount of the read and write traffic (e.g., in MB per second) over the fabric interconnect 108 to maintain consistency with the fabric-attached memory module or other replicas of the fabric-attached memory module) is less than the overhead of not replicating the fabric-attached memory module in the cache memory 122 (e.g., the amount of the read and write traffic (e.g., in MB per second) over the fabric interconnect 108 to read from and write to the fabric-attached memory module).

In one or more implementations, the memory replication triggering module 208 uses a rule of write traffic to a fabric-attached memory module over a particular duration of time (e.g., 100 seconds) falling below a threshold amount (e.g., 10% of the total write traffic to the fabric-attached memory modules 132 and 134). The memory replication triggering module 208 determines the amount of write traffic (e.g., in MBs) in each epoch (e.g., each second) over the duration of time and determines the amount of write traffic over the duration of time (e.g., averages the amount of write traffic in each epoch, sums the amount of write traffic in each epoch). The amount of write traffic over the duration of time is determined for the router 156 (e.g., for all write traffic received by the router 156 during the duration of time) as well as for each fabric-attached memory module 132 and 134 (e.g., the amount of write traffic to each fabric-attached memory module 132 and 134). The task offload triggering module 206 determines that the rule is satisfied if the amount of write traffic to a fabric-attached memory module 132 or 134 falls below a threshold amount (e.g., 10% of the write traffic received by the router 156).

In one or more implementations, the duration of time and the epoch are configurable parameters, for example settable an administrator or user of the disaggregated memory system.

In one or more implementations, the duration and epoch of time are a rolling window. For example, every 1 second or every 5 seconds the memory replication triggering module 208 determines whether a rule is satisfied by the preceding duration of time. Additionally or alternatively, the duration and epoch of time are fixed. For example, after a duration of time elapses the next duration of time begins, so if the duration of time is 100 seconds then a new duration of time begins every 100 seconds.

In one or more implementations, the tracking system 160 also receives access data from other tracking systems in other routing systems (e.g., tracking system 164 in routing system 112). This additional access data from other tracking systems allows memory replication triggering module 208 to use rules to determine when to provide the memory replication indication 214 to the host application 114 that are based on the access data 210 tracked and recorded by the memory replication triggering module 208 as well as the additional access data tracked and recorded by other tracking systems.

In response to a rule being satisfied, the memory replication triggering module 208 communicates the memory replication indication 214 to the host application 114 to initiate replicating of the fabric-attached memory in fabric-attached memory module 132 or 134 to the cache memory 122. The fabric-attached memory that is replicated is the fabric-attached memory included in the fabric-attached memory module 132 or 134 that caused the rule to be satisfied (e.g., the fabric-attached memory module 132 or 134 to which the write traffic caused the rule to be satisfied). The fabric-attached memory is replicated in the cache memory of each computing node accessing the fabric-attached memory module 132 or 134 that caused the rule to be satisfied.

Replicating the fabric-attached memory in the cache memory 122 refers to copying the fabric-attached memory from the fabric-attached memory module 132 or fabric-attached memory module 134 into the cache memory 122. Subsequent read and write accesses to the replicated memory by the processing element 120 are handled by the cache memory 122 rather than the fabric-attached memory module 132 or fabric-attached memory module 134, thereby alleviating traffic over the fabric interconnect 108 to access the fabric-attached memory module 132 or fabric-attached memory module 134.

Figure 4:
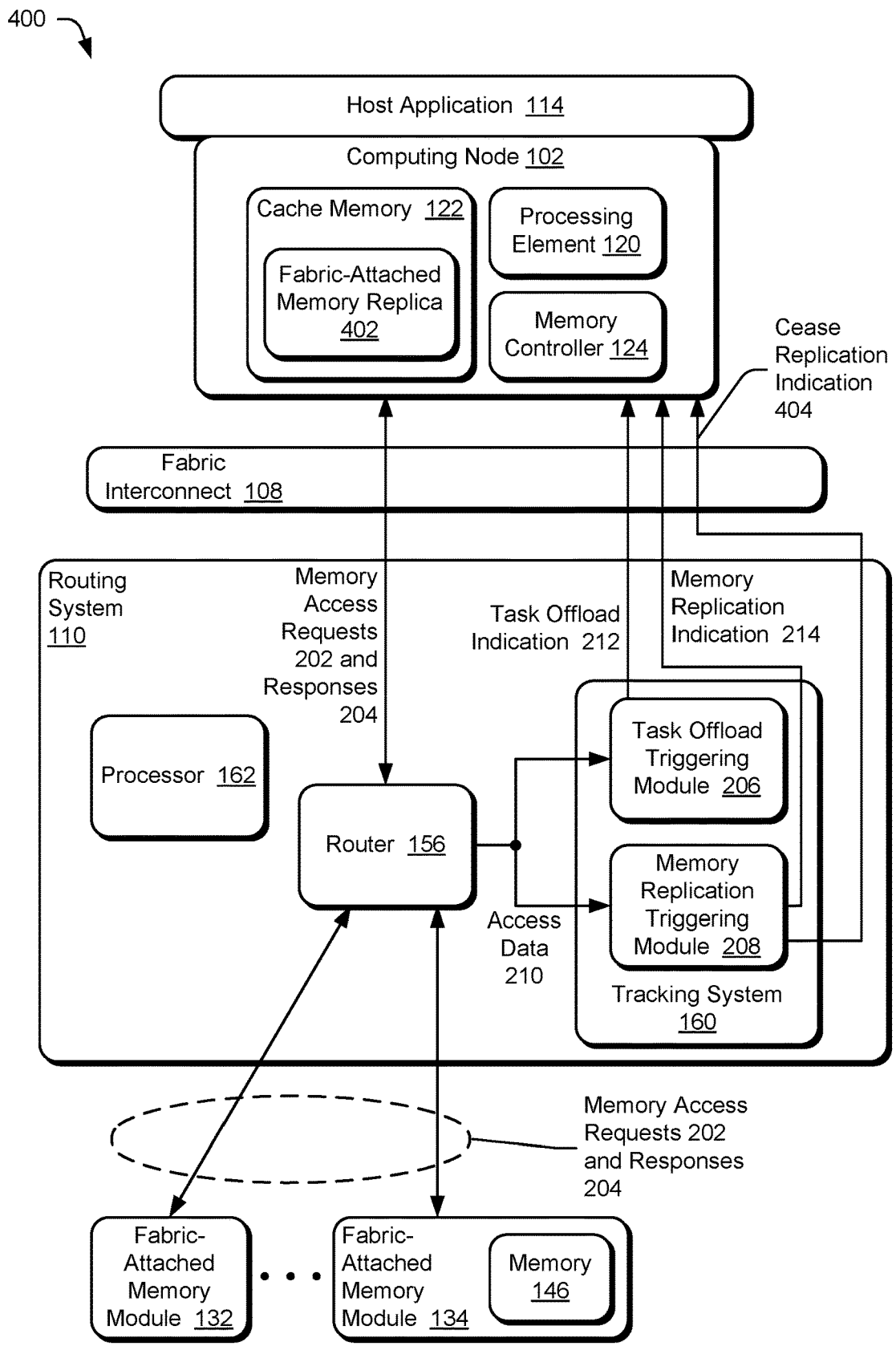

FIG. 4 is an illustration of an example 400 of a routing system and routing system operation. The example 400 is similar to the example 200 of FIG. 2 but includes memory 146 from fabric-attached memory module 134 being replicated in the cache memory 122. Subsequent read and write accesses to the memory addresses in the memory 146 are to the fabric-attached memory replica 402 rather than the fabric-attached memory 146 in the fabric-attached memory module 134. While being maintained in the cache memory 122, the fabric-attached memory replica 402 is not swapped out or replaced by other data from other fabric-attached memory modules. Accordingly, memory controller 124 treats the fabric-attached memory replica 402 differently than other cache memory in that the fabric-attached memory replica 402 remains in cache memory 122 until the memory 146 is no longer being replicated in cache memory 122.

The memory 146 from fabric-attached memory module 134 is replicated as fabric-attached memory replica 402 in any of a variety of manners. In one or more implementations, the host application 114 issues multiple memory read requests from the fabric-attached memory module 134 to have the memory 146 read and stored in cache memory 122 as fabric-attached memory replica 402. Additionally or alternatively, the memory controller 124 and fabric-attached memory module 134 support a replication command that, when invoked, copies the memory 146 from the fabric-attached memory module 134 to the cache memory 122 as fabric-attached memory replica 402.

In one or more implementations, as part of the process of maintaining memory consistency in the disaggregated memory system, including maintaining the fabric-attached memory replica 402, write accesses to the memory 146 by a computing node other than computing node 102 are communicated (e.g., by the media controller 144 of the fabric-attached memory module 134) to the memory controller 124 for inclusion in fabric-attached memory replica 402.

The memory replication triggering module 208 continues to receive access data 210 while the fabric-attached memory is replicated in cache memory 122. This access data 210 includes data describing the memory access requests 202. These memory access requests 202 include writes to the fabric-attached memory module 134 to maintain consistency between the fabric-attached memory replica 402 and the memory 146. The memory replication triggering module 208 detects when the rule that was satisfied and resulted in replicating of the memory 146 in the cache memory 122 is no longer satisfied. In response to determining that the rule is no longer satisfied, the memory replication triggering module 208 communicates a cease replication indication 404 to the host application 114 (e.g., via the fabric interconnect 108) to no longer replicate the memory 146 in the cache memory 122.

In response to the cease replication indication 404, the host application 114 or memory controller 124 ceases maintaining fabric-attached memory replica 402. In one or more implementations, the memory controller 124 erases the fabric-attached memory replica 402. Additionally or alternatively, the memory controller allows the fabric-attached memory replica 402 to remain in cache memory 122 but no longer treats that data in cache memory 122 as replicated from memory 146. Accordingly, portions of the fabric-attached memory replica 402 are eligible to be swapped out or replaced by data from other fabric-attached memory modules.

In response to the cease replication indication 404, the memory controller 124 also notifies the fabric-attached memory module 134 that the memory 146 is no longer being replicated at the computing node 102. Accordingly, the media controller 144 of the fabric-attached memory module 134 need no longer communicate changes to the memory 146 to the memory controller 124.

In one or more implementations, if the rule that was satisfied and resulted in replicating the memory 146 in the cache memory 122 included a threshold value, the memory replication triggering module 208 uses a different threshold when detecting whether the rule is no longer satisfied. This different threshold value is, for example, 10% or 20% higher or lower than the threshold value of the rule. This avoids situations in which the memory is repeatedly replicated in the cache memory 122 then having that replication cease because the rule is satisfied by values very close to the threshold value.

For example, if the rule is write traffic to a fabric-attached memory module over a particular duration of time (e.g., 100 seconds) falling below a threshold amount (e.g., 10% of the total write traffic to the fabric-attached memory modules 132 and 134), after the rule is satisfied and the memory 146 is replicated in cache memory 122, that threshold amount is raised (e.g., to 12% or 15%). Accordingly, the memory replication triggering module 208 does not detect that the rule is no longer satisfied until the write traffic no longer falls below the raised threshold amount (e.g., 12% or 15%). Thus, if the write traffic to a fabric-attached memory module 132 or 134 is hovering around 9%-11% of the total write traffic to the fabric-attached memory modules 132 and 134, the memory 146 is not repeatedly switching between being replicated in the cache memory 122 and not being replicated in the cache memory 122.

With reference to FIGS. 2, 3, and 4, the operation of a single routing system 110 and computing node 102 are illustrated for ease of explanation. It should be noted that other routing systems and computing nodes in the disaggregated memory system 100 operate analogously.

Furthermore, although the routing system is illustrated as including both the task offload triggering module 206 and the memory replication triggering module 208, in one or more implementations the tracking system 160 need not include both the task offload triggering module 206 and the memory replication triggering module 208. For example, in routing systems in which task offloading is implemented but memory replication is not implemented, the tracking system 160 need not include the memory replication triggering module 208. By way of another example, in routing systems in which memory replication is implemented but task offloading is not implemented, the tracking system 160 need not include the task offload triggering module 206.

Returning to FIG. 1, in one or more implementations information regarding the offloading of tasks to the processors 162 and 166 is presented to a user of the disaggregated memory system 100. For example, an administrator, developer, or other user of the disaggregated memory system 100 is able to access information regarding the host application 114, such as processes or threads of the host application 114. This information is made available by, for example, an operating system run on the computing nodes 102. This information includes a location where the process or thread is being executed, such as identification of a particular processing element 120 or 126 or a particular processor 162 or 166. A user interface displaying this location for each of multiple processes or threads of the host application 114 is displayed to the user.

The following discussion describes techniques that are implemented utilizing the previously described systems and devices. Aspects of the procedure are implemented in hardware, firmware, software, or a combination thereof. The procedure is shown as a set of blocks that specify operations performed by one or more devices and are not necessarily limited to the orders shown for performing the operations by the respective blocks. Furthermore, although various operations performed by one or more devices are recited, the techniques discussed herein additionally or alternatively include additional operations. In portions of the following discussion, reference is made to FIGS. 1-4.

Figure 5:
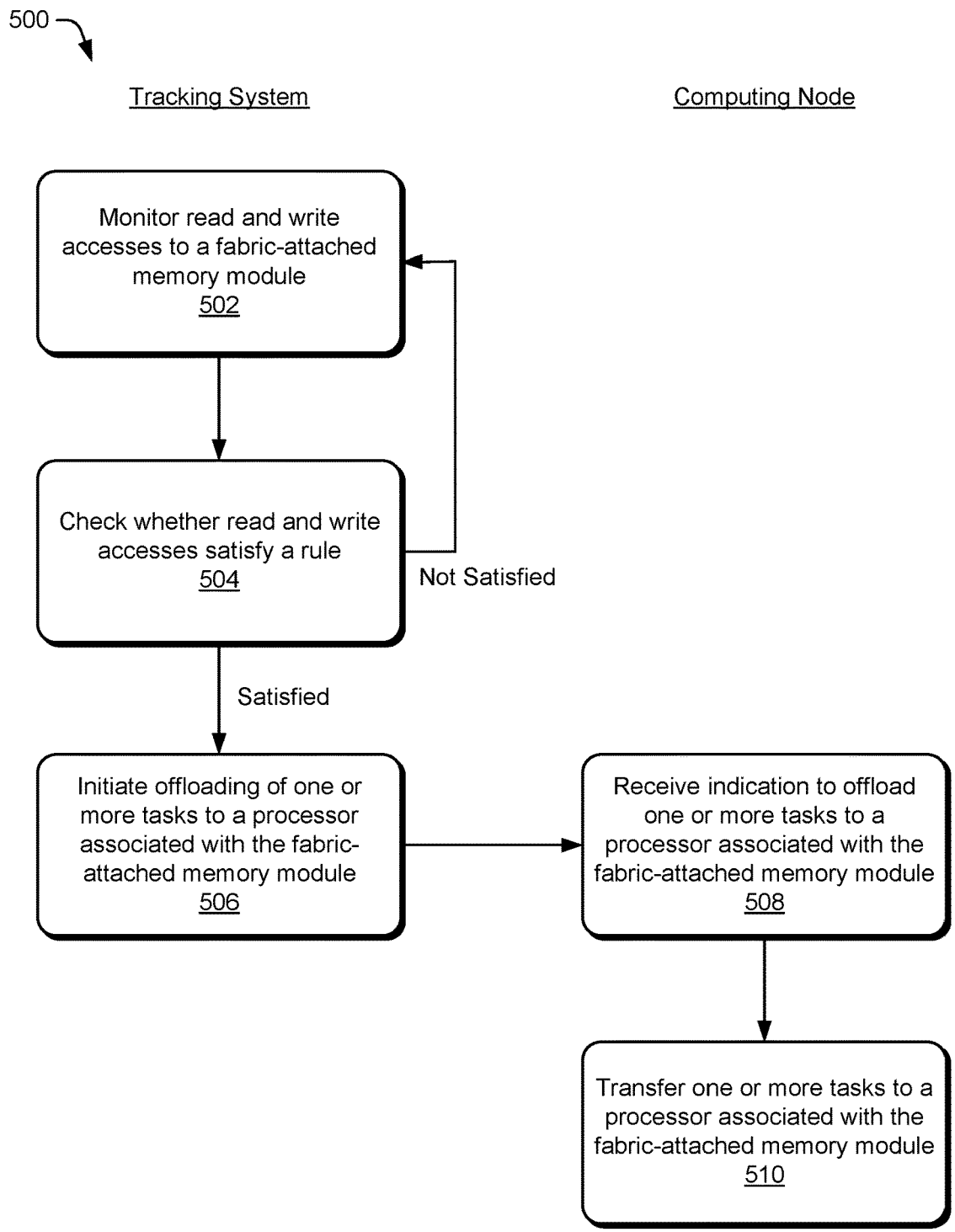
FIG. 5 is a flow diagram depicting a procedure in an example implementation of alleviating interconnect traffic in a disaggregated memory system.

FIG. 5 is a flow diagram 500 depicting a procedure in an example implementation of alleviating interconnect traffic in a disaggregated memory system. Blocks on the left side of the flow diagram 500 are performed by a tracking system such as tracking system 160 or tracking system 164, and blocks on the right side of the flow diagram 500 are performed by a computing node such as computing node 102 or computing node 104 running one or more processes or threads of a host application 114.

In this example, read and write accesses to a fabric-attached memory module are monitored (block 502). These read and write accesses are received via a fabric interconnect of a disaggregated memory system.

A check is made as to whether the read and write accesses satisfy a rule (block 504). One or more of various different rules are checked such as whether total read and write traffic to the fabric-attached memory module over a duration of time exceeds a threshold amount, the threshold amount being a percentage of a total read and write traffic to the fabric-attached memory module as well as one or more additional fabric-attached memory modules.

The tracking system continues to monitor the read and write accesses in response to the rule not being satisfied (block 502).

The tracking system initiates offloading of one or more tasks to a processor associated with the fabric-attached memory module in response to the rule being satisfied (block 506). In one or more implementations, the offloading of the one or more tasks is initiated by communicating a task offload indication to the computing node running one or more tasks that are generating the read and write traffic to the fabric-attached memory module that caused the rule to be satisfied.

The computing node receives the indication to offload one or more tasks to a processor associated with the fabric-attached memory module (block 508). In one or more implementations, the computing node is executing one or more processes or threads of a host application.

One or more tasks are transferred to a processor associated with the fabric-attached memory module in response to the indication (block 510). This transfer is performed, for example, by a thread of the host application. The one or more tasks are transferred from execution by the computing node to execution by a processor associated with and directly accessing a router coupled to the fabric-attached memory module, avoiding the need to communicate subsequent memory accesses from the task via the fabric interconnect.

Figure 6:
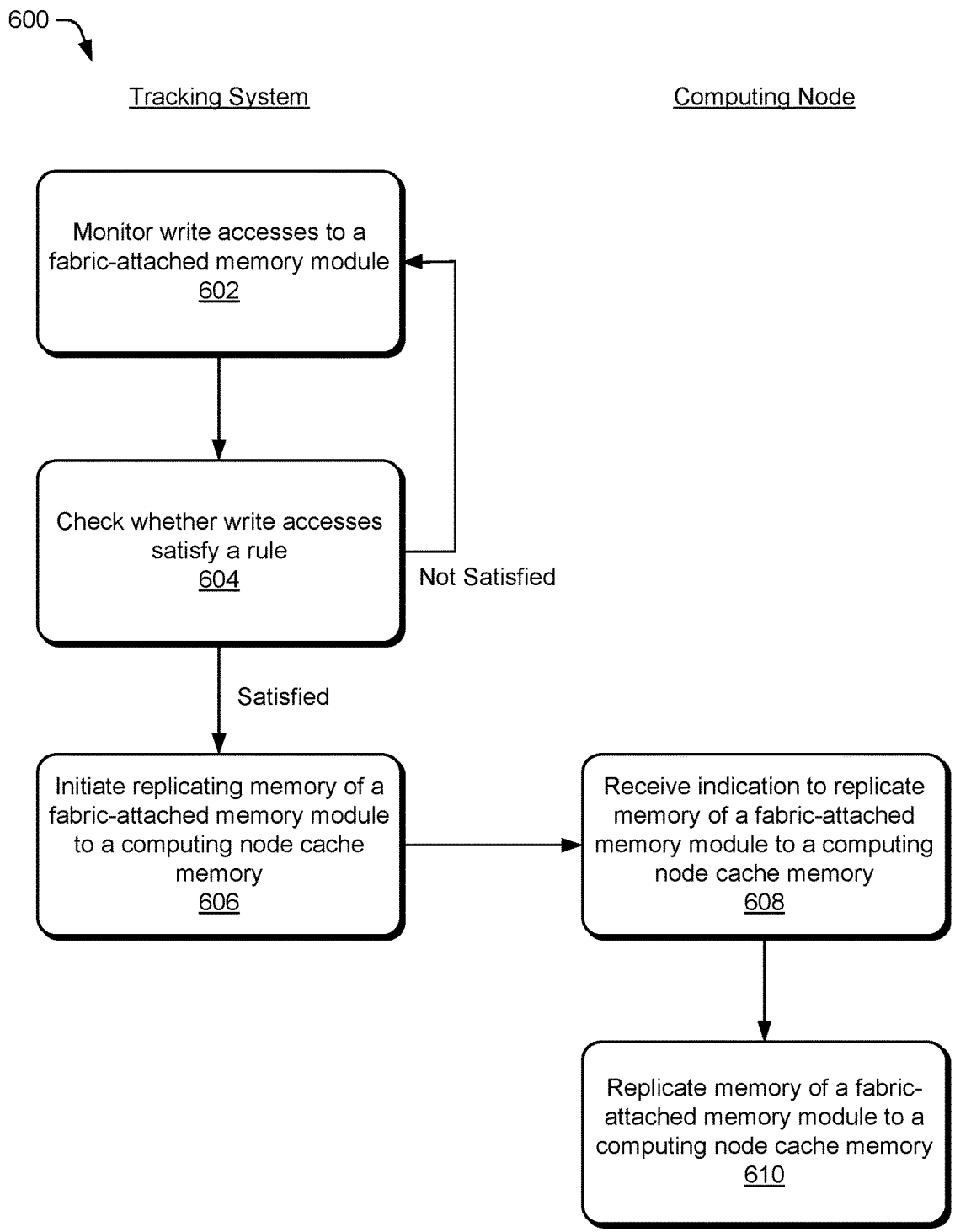
FIG. 6 is a flow diagram depicting another procedure in an example implementation of alleviating interconnect traffic in a disaggregated memory system.

FIG. 6 is a flow diagram 600 depicting a procedure in an example implementation of alleviating interconnect traffic in a disaggregated memory system. Blocks on the left side of the flow diagram 600 are performed by a tracking system such as tracking system 160 or tracking system 164, and blocks on the right side of the flow diagram 600 are performed by a computing node such as computing node 102 or computing node 104 running one or more processes or threads of a host application 114.

In this example, write accesses to a fabric-attached memory module are monitored (block 602). These write accesses are received via a fabric interconnect of a disaggregated memory system.

A check is made as to whether the write accesses satisfy a rule (block 604). One or more of various different rules are checked such as whether total write traffic to the fabric-attached memory module over a duration of time falls below a threshold amount, the threshold amount being a percentage of a total write traffic to the fabric-attached memory module as well as one or more additional fabric-attached memory modules.

The tracking system continues to monitor the write accesses in response to the rule not being satisfied (block 602).

The tracking system initiates replication of memory in the fabric-attached memory module to a cache memory of a computing node in response to the rule being satisfied (block 606). In one or more implementations, the replication of memory is initiated by communicating a memory replication indication to the computing node running one or more tasks that are generating write traffic to the fabric-attached memory module that caused the rule to be satisfied.

The computing node receives the indication to replicate memory from the fabric-attached memory module to a cache memory of the computing node (block 608). In one or more implementations, the computing node is executing one or more processes or threads of a host application.

The memory from the fabric-attached memory module is replicated in the cache memory of the computing node (block 610). This replication is performed, for example, by a thread of the host application.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the processing element 120, the cache memory 122, the memory controller 124, the processing element 126, the cache memory 128, the memory controller 130, the router 156, the tracking system 160, the processor 162, the router 158, the tracking system 164, the processor 166, the media controller 140, the media controller 144, the media controller 148, and the media controller 152) are implemented in any of a variety of different manners such as hardware circuitry, software executing or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
monitoring read and write accesses by a processor of a computing node to a fabric-attached memory module received via a fabric interconnect of a disaggregated memory system; and
initiating, based on the read and write accesses to the fabric-attached memory, offloading of one or more tasks accessing the fabric-attached memory from the processor of the computing node to a processor of a routing system that is configured to route the read and write accesses to the fabric-attached memory and at least one additional fabric-attached memory.

2. The method of claim 1, further including detecting when the read and write accesses to the fabric-attached memory satisfy a rule, and the initiating including initiating offloading of the one or more tasks in response to detecting that the read and write accesses to the fabric-attached memory satisfy the rule.

3. The method of claim 2, the rule including a total read and write traffic to the fabric-attached memory over a duration of time exceeding a threshold amount, the threshold amount being a percentage of a total read and write traffic to the fabric-attached memory and the at least one additional fabric-attached memories coupled to the routing system.

4. The method of claim 2, further including:
detecting, after the one or more tasks are offloaded to the processor, that the rule is no longer satisfied; and
indicating, in response to detecting that the rule is no longer satisfied, to cease offloading of the one or more tasks to the processor of the routing system.

5. The method of claim 1, the one or more tasks including one or more threads of a host application running in the disaggregated memory system.

6. The method of claim 1, the one or more tasks including all tasks of a host application running in the disaggregated memory system that read from or write to the fabric-attached memory.

7. The method of claim 1, further including initiating, based on the write access to the fabric-attached memory, replicating memory of the fabric-attached memory to a cache memory of the computing node.

8. The method of claim 7, further including detecting when the write accesses to the fabric-attached memory satisfy a rule, and the initiating replicating of the memory including initiating replicating of the memory in response to detecting that the write accesses to the fabric-attached memory satisfy the rule.

9. The method of claim 8, the rule including a total write traffic to the fabric-attached memory over a duration of time falling below a threshold amount, the threshold amount being a percentage of a total write traffic to the fabric-attached memory and the at least one additional fabric-attached memories.

10. The method of claim 1, further comprising:
executing one or more processes or threads by the processor of the routing system; and
ceasing executing the one or more processes or threads by the processor of the computing node.

11. The method of claim 1, wherein the one or more tasks include one or more processes or threads of a host application executed by the processor of the computing node.

12. A method comprising:
receiving an indication that read and write accesses to a fabric-attached memory via a fabric interconnect of a disaggregated memory system satisfy a rule; and
transferring, in response to the indication, a task accessing the fabric-attached memory from execution by a processor of a computing node that accesses, via the fabric interconnect, a router of a routing system coupled to the fabric-attached memory to execution by a processor of the routing system.

13. The method of claim 12, the task including all threads of a host application running in the disaggregated memory system that read from or write to the fabric-attached memory.

14. The method of claim 12, the rule including a total read and write traffic to the fabric-attached memory over a duration of time exceeding a threshold amount.

15. A system comprising:
a router to receive, from a process or thread of a host application executed by a processor of a computing node, write accesses to a fabric-attached memory via a fabric interconnect of a disaggregated memory system; and
a tracking controller to:
receive access data describing the write accesses to the fabric-attached memory and initiate, based on the write accesses to the fabric-attached memory, replicating memory of the fabric-attached memory to a cache memory of the computing node in the disaggregated memory system executing one or more tasks of a host application; and
receive the access data describing the write accesses as well as access data describing read accesses to the fabric-attached memory, and to initiate, based on the read and write accesses to the fabric-attached memory, offloading of one or more tasks accessing the fabric-attached memory to an additional processor.

16. The system of claim 15, the tracking controller being further to detect when the write accesses to the fabric-attached memory satisfy a rule, and wherein to initiate replicating the memory is to initiate replicating the memory in response to detecting that the write accesses to the fabric-attached memory satisfy the rule.

17. The system of claim 16, the rule including a total write traffic to the fabric-attached memory over a duration of time falling below a threshold amount, the threshold amount being a percentage of a total write traffic to the fabric-attached memory as well as one or more additional fabric-attached memories.

18. The system of claim 16, the tracking controller being further to detect, after initiating replicating the memory, that the rule is no longer satisfied, and to indicate, in response to detecting that the rule is no longer satisfied, to cease replicating the memory to the cache memory of the computing node.

19. The system of claim 14, the tracking controller being further to detect when the read and write accesses to the fabric-attached memory satisfy a rule, and to initiate offloading of the one or more tasks in response to detecting that the read and write accesses to the fabric-attached memory satisfy the rule.

20. The system of claim 19, the rule including a total read and write traffic to the fabric-attached memory over a duration of time exceeding a threshold amount, the threshold amount being a percentage of a total read and write traffic to the fabric-attached memory as well as one or more additional fabric-attached memories.

* * * * *